United States Patent Office 2,733,830
Patented Feb. 7, 1956

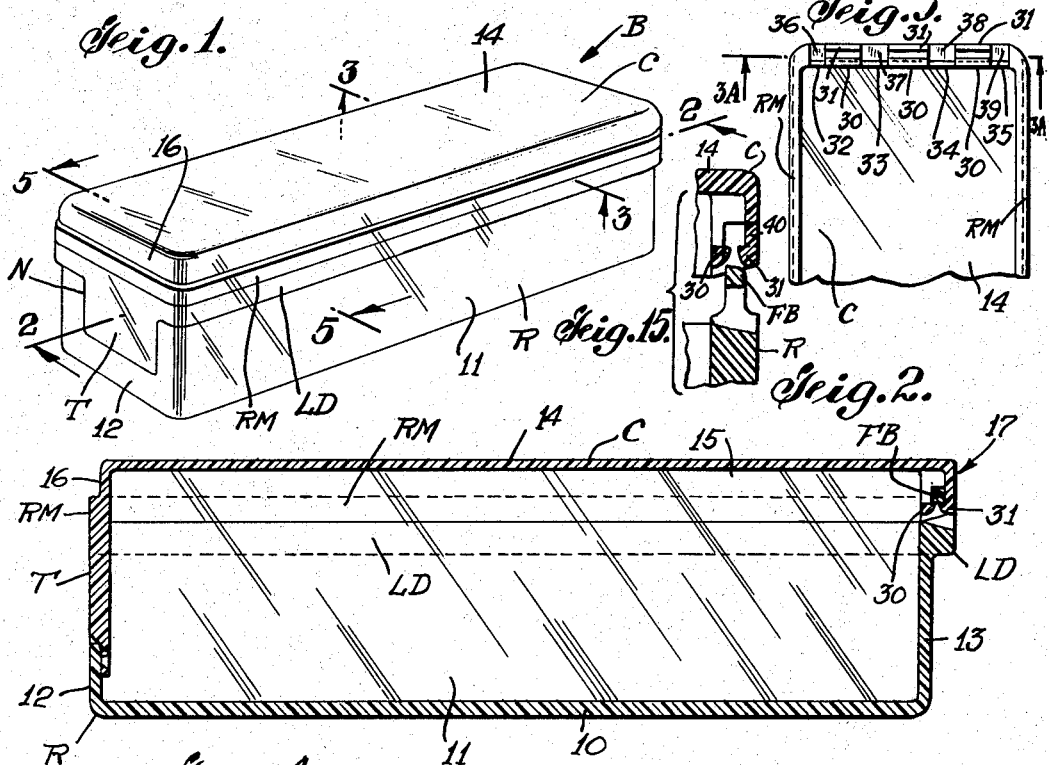
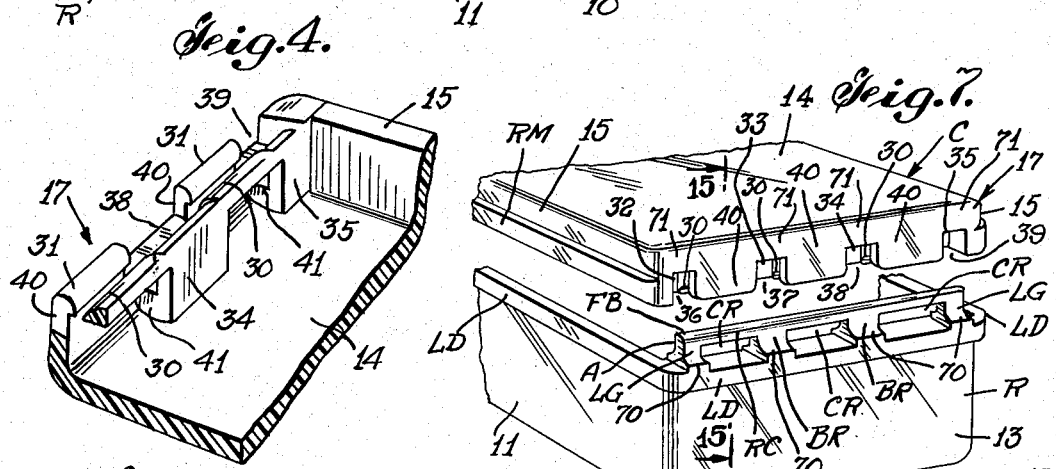
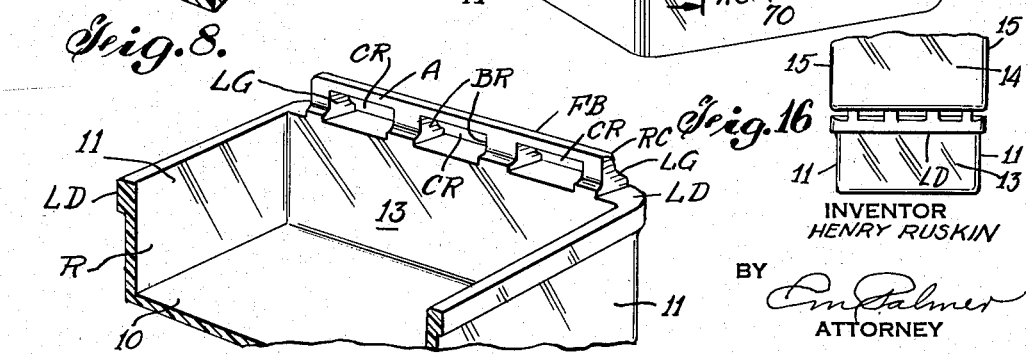

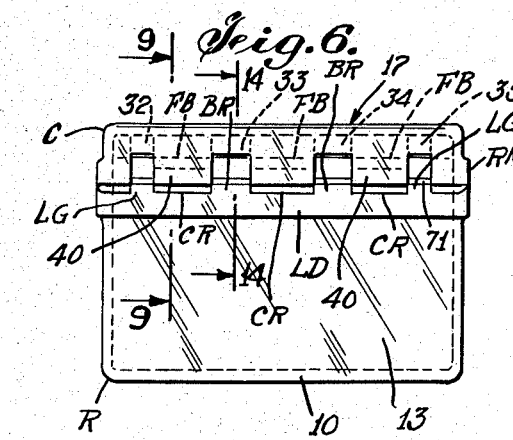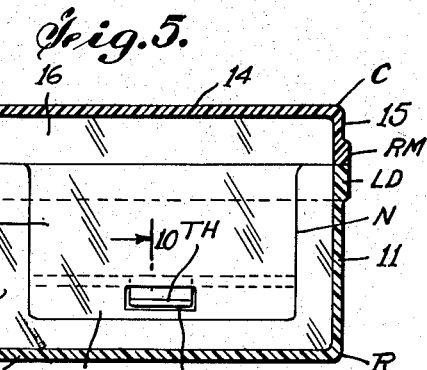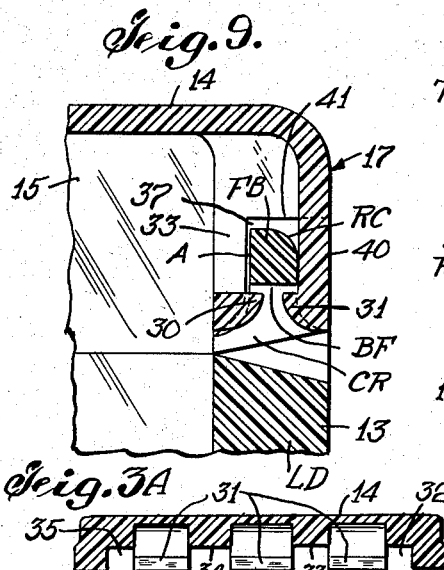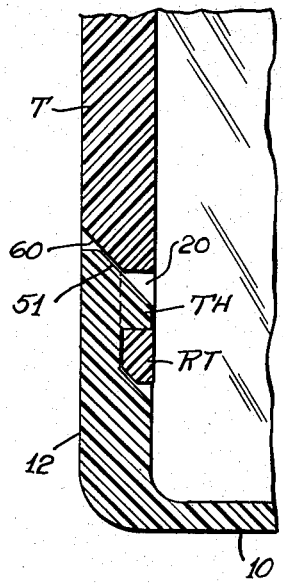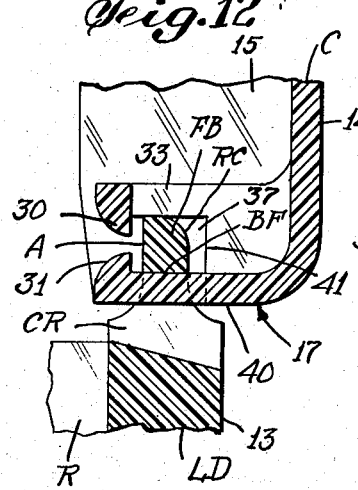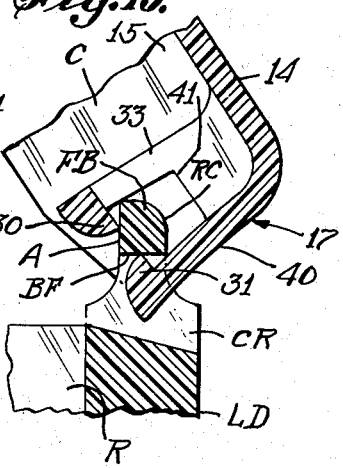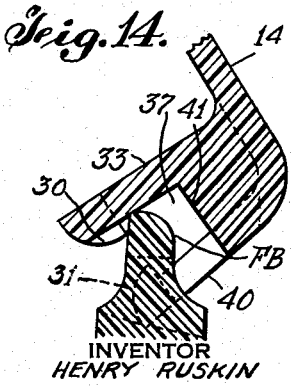

2,733,830

PLASTIC BOX HINGE

Henry Ruskin, Bayside, N. Y., assignor to Swingline Inc., New York, N. Y., a corporation of New York Application April 22, 1953, Serial No. 350,333

2 Claims. (Cl. 220—31)

This invention is a functionally and structurally improved plastic box and specifically is concerned with the novel and serviceable hinge. Other important features will be apparent from the following detailed specification wherein:

Fig. 1 is a perspective view of the box according to my invention illustrating the swingable cover closed and locked.

Fig. 2 is a longitudinal sectional view on the line 2—2 of Fig. 1.

Fig. 3 is an underneath view of the swingable cover.

Fig. 3A is a view taken on the line 3A—3A of Fig. 3.

Fig. 4 is a fragmentary inside perspective view of the cover.

Fig. 5 is a transverse sectional view on the line 5—5 of Fig. 1.

Fig. 6 is a rear elevational view of Fig. 1.

Fig. 7 is a fragmentary perspective view showing the cover detached from the receptacle.

Fig. 8 is a fragmentary perspective view of the receptacle illustrating the inverted U shaped fulcrum bar and the intermediate braces to prevent sagging thereof.

Fig. 9 is an enlarged fragmentary sectional view taken on the line 9—9 of Fig. 6.

Fig. 10 is an enlarged fragmentary sectional view on the line 10—10 of Fig. 5 depicting the depending tongue of the hinged cover interlocked with the rearwardly projecting tooth extending from the inside face of the front wall of the receptacle.

Fig. 11 is a view similar to Fig. 10 but illustrating the depending tongue of the cover unlatched from the front wall of the receptacle to permit swingable displacement of the cover relative to the fulcrum bar.

Fig. 12 is a view similar to Fig. 9 but showing the cover fully opened.

Fig. 13 is a view similar to Fig. 12 however exhibiting the cover held in an intermediate position relative to the receptacle.

Fig. 14 is a view similar to Fig. 13 taken along the lines 14—14 of Fig. 6 but with the cover raised to an intermediate position.

Fig. 15 is a sectional view on the line 15—15 of Fig. 7, showing the cover disconnected from the receptacle but in position for prompt assembly therewith.

Fig. 16 is a fragmentary rear elevational view of the box, illustrating the cover swung open.

Illustrative of the embodiment disclosed, the box generally designated B, embodies receptacle R to which the cover C is hingedly connected.

Both the receptacle and cover may be of a suitable plastic material. Receptacle R is a one piece member having bottom wall 10 from which extend the spaced side walls 11 merged with front and rear side walls 12 and 13 also integral with bottom wall 10.

The cover likewise is a one piece member characterized by the top wall 14 from which depends side walls 15, the front wall 16 and the rear wall 17.

As to the receptacle, the sides 11 and rear wall 13 are reinforced at the upper margins thereof by the overhanging reinforcing ledge LD.

Concerning the cover C, sides 15 and front wall 16 thereof embody the reinforced margin RM adapted to be seated on ledge LD when the cover is swung closed. However depending from the margin RM at the front wall 16 of cover C is the slightly resilient tongue T complementary to and removably fitting in recess or notch N interrupting front wall 12 of the receptacle R.

Tongue T has depending reduced terminal RT (Fig. 11) provided with opening 20 adapted to receive and disengageably interlocked with projection or tooth TH extending rearwardly from front wall 12 of the receptacle.

Regarding the receptacle (Fig. 8), fulcrum bar FB is integral with although spaced from ledge LD by the outside legs or braces LG and the spaced intervening braces BR, the latter serving to prevent sagging of this bar which has its anterior face A and bottom face BF disposed substantially normal to each other while its top and posterior faces merge into a convexed or rounded corner cam face RC.

Ledge LD, bar FB together with legs or braces LG and BR define spaced openings or slots CR to allow reception of the several pairs of spaced but companion lips 30 and 31 (Fig. 4) of the cover, normally spaced apart a distance less than the thickness of fulcrum bar FB.

Of importance it should be observed that the inside lips 30 constitute bridge means integrally merged with and interposed between webs or legs 32, 33, 34 and 35 (Figs. 3 and 4) which in turn are integral with wall top 14 of the cover C and are staggered in respect to depending outside lips 31 and spaced therefrom.

For purposes of specification it may be stated that webs 32, 33, 34 and 35 define with wall 14, the spaced recesses 36, 37, 38 and 39 (Fig. 7) for reception of bracer LG and BR of the receptacle.

It should be observed that outside lips 31 extend from ears 40 depending from rear wall 17 of the cover. Webs 32, 33, 34 and 35 merge with shoulders as 41 (Figs. 4, 12–14) which in turn are integral with the top wall 14 and rear wall 17 of the cover and serve also to reinforce webs 32, 33, 34 and 35 which yield slightly when the cover is snapped onto and over fulcrum bar FB in the manner indicated in Figs. 13 and 14, that is, one of the advantages of the present invention resides in the ease of assembly of the cover and receptacle. For example, in Fig. 15, the cover is disconnected from the receptacle and positioned to be snapped into interlocking relation therewith. To this end, the cover is merely pressed downwardly, permitting lips 30 and 31 to engage fulcrum bar FB thus causing these lips to diverge to pass by bar FB and thereafter resiliently retract to be under this bar, thus interlocking therewith as illustrated in Figs. 2 and 9, there being ample clearance between recesses 36, 37, 38 and 39 to allow for swinging movement of the cover relative to the bar even though lips 30 and 31 securely retain the cover interlocked with the bar.

Of course when the cover is closed lips 30 and 31 are within the clearing slots or openings CR. However as the cover is swung to its closed position, beveled face 50 of tongue T (Fig. 11) causes terminal RT to flex inwardly and after passing tooth TH, resiliently retracts to permit the latter to be received by slot or opening 20 at which time biased face 60 of tongue T meets the inclined or beveled faces 51 which thus acts as a stop. The swingable cover is now fully closed or locked.

To open the cover, tongue T is pressed inwardly. This action flexes this tongue rearwardly, thus removing terminal RT completely away from the tooth TH. The cover may then be swung rearwardly to open the box.

As previously mentioned, both the cover and receptacle are of an appropriate plastic material, such as styrene or the like. Consequently lips 30 and 31 "give" slightly when the cover is snapped over the fulcrum bar FB. By such action outside ears 40 as well as webs 32, 33, 34 and 35 also yield or give, that is, are flexed outwardly. Advantage is taken of the reactive thrust caused by such flexing to hold the cover in a partly opened relation, for instance, note Fig. 13, where web 33 and ear 40 frictionally bear against the diagonal distance across the cross section of bar FB.

In the fully opened position of the receptacle, shoulders 70 of braces LG and BR (Fig. 7) cooperate with spaced portions 71 of the interrupted rear wall 17 of the cover to limit further rearward displacement of the cover.

Various changes may be made in details of construction and arrangement of parts without departing from the scope of the invention or sacrificing any of the advantages thereof inherent therein.

I claim:

1. In a box, a plastic receptacle having a ledge, a fulcrum bar upwardly spaced from said ledge and defining in cross section a bottom substantially horizontal rectilinear face and a vertical rectilinear face substantially normal to said bottom horizontal face, said faces defining an apex portion at the lower inner corner of said bar, said bar having an outside convex cam face opposite said apex portion and merging with said faces to define therewith corner portions spaced from said apex portion, spaced braces interconnecting said bar and ledge and defining therewith spaced openings, a plastic cover having an interrupted outside depending wall defining spaced resilient ears each having a laterally extending lip projecting in a direction towards said vertical face, means integrally depending from a part of said cover and spaced forwardly of said outside depending wall and embodying resilient spaced webs staggered in respect to said spaced ears and defining with said cover spaced recesses for reception of said braces and comprising resilient bridge means interconnecting the lower portions of said spaced webs and having spaced lips spaced from, in alinement with and opposing said first mentioned lips and normally defining therewith gaps having a width less than the thickness of said fulcrum bar, said convex cam face cooperating to slightly spread said lips upon shifting of said cover downwardly towards and against said fulcrum bar to permit said lips to snap over and under said vertical face and cam face to provide for automatic retraction of said lips into said openings below said bottom horizontal face and apex portion and under said bar to movably interlock therewith and provide a hinge connection between said cover and receptacle, said web and ears cooperating with said corner portions to hold said cover partially pivotally raised from said receptacle.

2. In a box, a plastic receptacle having a ledge, a fulcrum bar upwardly spaced from said ledge and defining in cross section a bottom substantially horizontal rectilinear face and a vertical rectilinear face substantially normal to said horizontal face, said faces defining an apex portion at the lower inner corner of said bar, said bar having an outside convex cam face opposite said apex portion and merging with said faces to define therewith corner portions spaced from said apex portion, spaced braces interconnecting said bar and ledge and defining therewith spaced openings, stop shoulders carried by said braces, a plastic cover having an interrupted outside depending wall defining spaced resilient ears each having a laterally extending lip projecting in a direction towards said vertical face, means integrally depending from a part of said cover and spaced forwardly of said outside depending wall and embodying resilient spaced webs staggered in respect to said spaced ears and defining with said cover spaced recesses for reception of said braces and comprising resilient bridge means interconnecting the lower portions of said spaced webs and defining spaced lips spaced from, in alinement with and opposing said first mentioned lips and normally defining therewith gaps having a width less than the thickness of said fulcrum bar, said convex cam face cooperating to slightly spread said lips upon shifting of said cover downwardly towards and against said fulcrum bar to permit said lips to snap over and under said vertical face and cam face to provide for automatic retraction of said lips into said openings below said bottom horizontal face and apex portion and under said bar to movably interlock therewith and provide a hinge connection between said cover and receptacle, said web and ears cooperating with said corner portions to hold said cover partially pivotally raised from said receptacle, and said stop shoulders cooperating with said interrupted depending outside wall to limit swingable movement of said cover away from said receptacle.

References Cited in the file of this patent

UNITED STATES PATENTS

| | | |
|---|---|---|
| 2,200,399 | Primas | May 14, 1940 |
| 2,342,477 | Magnenat | Feb. 22, 1944 |
| 2,533,590 | Kutik, Jr. | Dec. 12, 1950 |
| 2,605,926 | Casey | Aug. 5, 1952 |

FOREIGN PATENTS

| | | |
|---|---|---|
| 428,819 | Great Britain | May 20, 1935 |